United States Patent
Wigton et al.

[19]

[11] Patent Number: 6,145,243
[45] Date of Patent: Nov. 14, 2000

[54] METHOD AND DEVICE PRODUCING $CO_2$ GAS FOR TRAPPING INSECTS

[75] Inventors: Bruce E. Wigton, Jamestown; Mark H. Miller, Hope, both of R.I.

[73] Assignee: American Biophysics Corporation, East Greenwich, R.I.

[21] Appl. No.: 09/009,950

[22] Filed: Jan. 21, 1998

Related U.S. Application Data

[63] Continuation-in-part of application No. 08/718,643, Sep. 17, 1996.

[51] Int. Cl.[7] .............................. A01M 1/06; A01M 5/08
[52] U.S. Cl. ................................. 43/139; 43/107
[58] Field of Search ............................. 43/113, 139, 107

[56] References Cited

U.S. PATENT DOCUMENTS

| | | | |
|---|---|---|---|
| 1,693,368 | 11/1928 | Cherry . | |
| 2,893,161 | 7/1959 | Reid | 43/139 |
| 3,196,577 | 7/1965 | Plunkett | 43/139 |
| 4,506,473 | 3/1985 | Waters, Jr. . | |
| 4,608,774 | 9/1986 | Sherman | 43/114 |
| 4,785,573 | 11/1988 | Millard . | |
| 5,157,865 | 10/1992 | Chang | 43/113 |
| 5,167,090 | 12/1992 | Cody | 43/139 |
| 5,189,830 | 3/1993 | Montemurro | 43/107 |
| 5,205,064 | 4/1993 | Nolen . | |
| 5,205,065 | 4/1993 | Wilson et al. | 43/113 |
| 5,301,458 | 4/1994 | Deyoreo et al. | 43/139 |
| 5,311,697 | 5/1994 | Cavanaugh et al. | 43/132.1 |
| 5,329,725 | 7/1994 | Bible | 43/113 |
| 5,382,422 | 1/1995 | Dieguez et al. . | |
| 5,417,009 | 5/1995 | Butler et al. | 43/113 |
| 5,595,018 | 1/1997 | Wilbanks . | |
| 5,647,164 | 7/1997 | Yates | 43/113 |
| 5,651,211 | 7/1997 | Regan | 43/114 |
| 5,657,576 | 8/1997 | Nicosia . | |
| 5,669,176 | 9/1997 | Miller . | |

FOREIGN PATENT DOCUMENTS 717.903  1/1932  France .

OTHER PUBLICATIONS

A.J. Grant et al. "Electrophysiological responses of receptor neurons in mosquito maxillary palp sensilla to carbon dioxide" *J Comp Physiol A*, 177:389–396, 1995.

Catalytic Burner Literature, Teledyne Brown Systems, Jan. 1, 1997.

*Primary Examiner*—Kurt Rowan
*Attorney, Agent, or Firm*—Taylor Russell & Russell, P.C.

[57] ABSTRACT

An insect trapping device generates its own insect attractants of carbon dioxide ($CO_2$), heat and water vapor through catalytic conversion of a hydrocarbon fuel in a combustion chamber. The hot insect attractants generated in the combustion chamber are diluted and cooled to a temperature above ambient temperature and below about 115° F. by mixing with air, and then the mixture is exhausted downward through the exhaust tube. A counterflow of outside air is drawn into the trap though the suction tube that concentrically surrounds the exhaust tube. Biting insects are captured in a porous, disposable bag connected to the other end of the suction tube. A thermoelectric generator, including thermoelectric modules coupled to the combustion chamber generate power for fans that provide the exhaust flow and the suction flow. Additional chemical attractants may be used with the device to make the trap even more effective. The trap may be adapted for trapping different types of insects by adjusting airflow velocities and attractants.

39 Claims, 5 Drawing Sheets

FIG-10

METHOD AND DEVICE PRODUCING $CO_2$ GAS FOR TRAPPING INSECTS

CROSS REFERENCE TO RELATED APPLICATIONS

This application is a continuation-in-part of co-owned U.S. patent application Ser. No. 08/718,643, by Mark H. Miller et al., filed Sep. 17, 1996.

BACKGROUND OF THE INVENTION

The invention relates to methods and apparatus for attracting and trapping or otherwise disabling insects, and, in particular, to a counterflow device that produces $CO_2$ gas and then cools the $CO_2$ gas for use as an insect attractant in an outflow from the trap.

Suction traps have been used in a variety of configurations to trap or kill insects. It is known to use screened material to trap the insects thus drawn into the trap, and to use mechanical, electrical or poison means to disable, injure or kill the insects. It is also known to use fan mechanisms to generate the suction flow, and to use lights or air-borne attractants, such as $CO_2$ and 1-octen-3-ol (octenol), to lure the insects to the vicinity of the trap. In some configurations, such as disclosed in U.S. Pat. No. 3,196,577 (Plunkett) and U.S. Pat. No. 5,157,090 (Cody), a small flow of an insect attractant is exhausted from the device to the outside of a much larger suction stream.

$CO_2$ gas used as an attractant is typically provided from a pressurized canister or by the sublimation of dry ice. The $CO_2$ gas thus produced is at ambient temperature or lower, and is released in a substantially undiluted state to the vicinity of the trap.

SUMMARY OF THE INVENTION

The invention provides a stand-alone, portable, self-powered insect trap that is capable of operating continuously for about one month on a single twenty-pound tank of propane fuel. The device generates its own insect attractants of carbon dioxide ($CO_2$), heat and water vapor through catalytic conversion of a hydrocarbon fuel in a combustion chamber. The trap device includes a counterflow insect trapping device of the type disclosed in co-owned patent application Ser. No. 08/718,643, the entire disclosure of which is included herein by reference. The hot insect attractants generated in the combustion chamber are diluted and cooled to a temperature above ambient temperature and below about 115° F. by mixing with air, and then the mixture is exhausted downward through an exhaust tube. A counterflow of outside air is drawn into the trap though a suction tube that concentrically surrounds the exhaust tube. Biting insects are captured in a porous, disposable bag connected to the other end of the suction tube. Thermoelectric modules coupled to the combustion chamber generate power for fans that provide the exhaust flow and the suction flow. Additional chemical attractants may be used with the device to make the trap even more effective. The trap may be adapted for trapping different types of insects by adjusting airflow velocities and attractants.

In one aspect, the invention provides an insect trapping apparatus that includes an insect trap having a trap inlet for the entry of insects, a $CO_2$ gas source capable of providing $CO_2$ gas having a temperature above ambient temperature, and an attractant exhaust system coupled to the $CO_2$ gas source. The attractant exhaust system is structured and arranged to cool heated $CO_2$ gas and to release an insect attractant comprised of the cooled $CO_2$ gas near the trap inlet at a temperature above ambient temperature and below approximately 115° F. The attractant can further include any combination of water vapor, air and an aromatic insect attractant, such as, for example, octenol.

The attractant exhaust system can be structured and arranged to release the insect attractant with a $CO_2$ concentration in a range between about 500 ppm and about 2500 ppm, or, more preferably for attracting mosquitos that prey on humans, with a $CO_2$ concentration in a range between about 1200 ppm and about 1800 ppm. The combustor can be structured and arranged to provide $CO_2$ gas at a rate of about 300 ml/min to about 500 ml/min.

The $CO_2$ gas source can include a combustion chamber having an outlet, and the attractant exhaust system can include an exhaust pipe communicating with the combustion chamber outlet. The exhaust pipe has an exhaust pipe outlet near the trap inlet, and an exhaust pipe inlet. The attractant exhaust system further includes an exhaust fan positioned to cause air to enter the exhaust pipe inlet and to encourage the insect attractant to flow out from the exhaust pipe outlet.

A net or mesh bag can be coupled to the trap inlet via a suction pipe, with a portion of the exhaust pipe extending within and through the suction pipe and extending out from the trap inlet. The trap can further include a suction fan arranged to draw an airflow in through the trap inlet and out through the mesh bag, the airflow being drawn into the trap inlet being directed counter to and substantially surrounding the exhaust flow of the cooled $CO_2$ gas being released through the exhaust pipe outlet. The suction fan and the exhaust fan can be powered by a thermoelectric generator that includes a thermoelectric module being thermally coupled on a hot side to the combustion chamber and being thermally coupled on a cold side to a heat exchanger. The suction fan can be arranged to direct the airflow from the mesh bag towards the heat exchanger. The suction fan can be arranged to draw the airflow through the trap inlet with a flow velocity of at least approximately 250 cm/sec.

In another aspect, the invention provides a method of trapping insects, including the steps of providing a trap having a trap inlet through which insects can enter into the trap, providing a mixture that includes $CO_2$ gas and air, and releasing the mixture near the trap inlet at a temperature above ambient temperature and below about 115° F. Providing the mixture can include producing heated $CO_2$ gas in a combustion chamber, directing the heated $CO_2$ gas from the combustion chamber into an exhaust pipe, the exhaust pipe having an exhaust pipe inlet open to air and an outlet near the trap inlet, and employing an exhaust fan to mix air from the exhaust pipe inlet with the heated $CO_2$ gas in the exhaust pipe. Producing heated $CO_2$ gas in a combustion chamber can include catalytically combusting a hydrocarbon fuel.

The method can further include the step of employing a suction fan to draw an inflow of air in an upward direction into the trap inlet, wherein releasing the mixture includes directing an exhaust flow of the mixture in a direction downward and counter to the inflow from an exhaust pipe outlet positioned directly below the trap inlet. The method may also include the step of employing a thermoelectric generator, including a thermoelectric module, to provide electric power to operate the exhaust fan and the suction fan, wherein the thermoelectric module is thermally coupled on a hot side to the combustion chamber and is thermally coupled on a cold side to a heat exchanger. Employing the suction fan can include drawing the inflow through the trap inlet with a flow velocity of at least approximately 250 cm/sec.

In yet another aspect, the invention provides an insect trapping apparatus that includes a trap enclosure; a suction line having a section including a suction line outlet being positioned inside the trap enclosure, and a downward-facing suction line inlet communicating with air outside the trap enclosure; a mesh bag covering the suction tube outlet; a suction fan structured and arranged to draw an inflow of air from outside the trap enclosure through the suction line inlet and then through the mesh bag into the trap enclosure, and blow the inflow out from the trap enclosure; a combustor including a combustor outlet, the combustor being capable of producing $CO_2$ gas and water vapor having a temperature above ambient temperature; an exhaust line being coupled to the combustor outlet, one end of the exhaust line having an exhaust line inlet being open to air, another end of the exhaust line having a downward-facing exhaust line outlet positioned directly below the suction line inlet outside the trap enclosure; and an exhaust fan structured and arranged to cause air to enter the exhaust line inlet and mix with heated $CO_2$ gas and water vapor entering the exhaust line from the combustor outlet to create an insect attractant mixture, and to blow the mixture out from the exhaust line at a temperature above ambient temperature and below approximately 115° F.

In one feature, the insect trapping apparatus can also include a thermoelectric generating system providing electric power to the suction fan and to the exhaust fan. The thermoelectric generating system includes a heat exchanger and a thermoelectric module, the thermoelectric module being thermally coupled on a cold side to the heat exchanger and being thermally coupled on a hot side to the combustion chamber. The suction fan blows the inflow of air on the heat exchanger to cool the heat exchanger.

In another feature, the insect trapping apparatus further includes an enclosure surrounding the combustor, the thermoelectric generating system and a portion of the exhaust line that is coupled to the combustor outlet.

In yet another feature, the insect trapping apparatus also includes a wheeled cart supporting the combustor enclosure and the trap enclosure.

In another aspect, the invention provides an insect trapping apparatus that includes an insect trap, including a trap inlet; a $CO_2$ gas source; and an attractant exhaust system coupled to the $CO_2$ gas source. The exhaust system is structured and arranged to produce a mixture of $CO_2$ gas and air with a $CO_2$ concentration within a range of about 500 parts per million (ppm) to about 2500 ppm and to release the mixture near the trap inlet. The exhaust system can be further structured and arranged to release the mixture near the trap inlet at a temperature above ambient temperature and below about 115° F.

The trapping apparatus of the invention provides several advantages and benefits. Foremost, the invention provides an extremely effective and economical device for capturing mosquitos and sand flies. A specific species of insect can be targeted for capture by adjusting the $CO_2$ concentration in the exhaust and by changing the elevation of the openings of the exhaust tube and of the suction tube.

The device is substantially maintenance free, the required maintenance primarily consisting of occasional changing of the disposable net bag in which insects are trapped and monthly refilling of the fuel tank. The device is built upon a wheeled platform, allowing it to be transported easily to a desired location and left unattended for long periods of time. The thermoelectric generating system provides all the electrical power needs of the trapping apparatus. It operates both day and night, and does not require sunlight or proximity to an electric outlet. The trapping apparatus is also very quiet—the fans are enclosed within the apparatus and the net bag makes no noise—and thus it will not disturb the natural serenity of any setting where it may be placed. The trapping apparatus is also relatively benign to the environment—a minimal amount of fuel is burned to produce a moderate amount of $CO_2$ gas and water vapor.

DETAILED DESCRIPTION OF THE INVENTION

Figure 1:
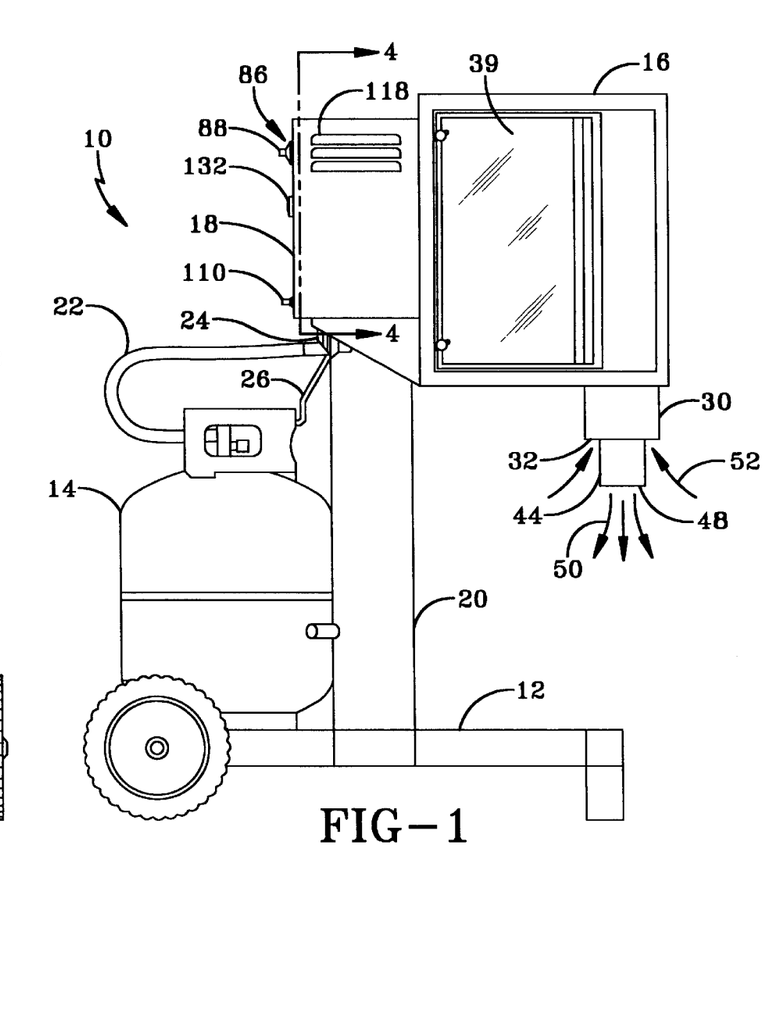
FIG. 1 is a side elevation view of an insect trapping apparatus according to the invention.
Figure 2:
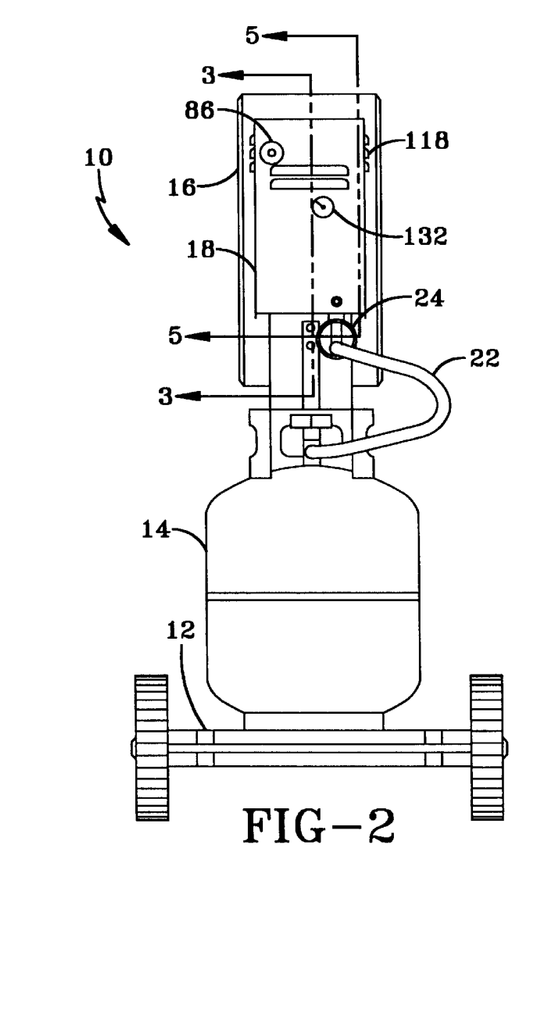
FIG. 2 is a front elevation view of the apparatus illustrated in FIG. 1.

Referring first to FIGS. 1 and 2, a portable insect trapping apparatus 10 is constructed on a wheeled platform 12 that allows the apparatus to be easily transported to a selected position out of doors. As will be described in greater detail below, trapping apparatus 10 generates a supply of $CO_2$ gas and water vapor, which is released as an insect attractant, and is also configured to generate all the electrical power it needs to operate. Trapping apparatus 10 can operate continuously and virtually unattended for an entire month on a single, standard 20-pound tank 14 of liquid propane fuel, which is supported on platform 12.

Trapping apparatus 10 includes a trap enclosure 16 and a generator enclosure 18, both of which are supported by an upright, hollow post 20. Post 20 is, in turn, fixed to platform 12. A flexible fuel line 22 connects between tank 14 and a 15 psi regulator 24 mounted on post 20. Tank 14 is secured on platform 12 by a retaining hook 26 that is bolted or otherwise secured to post 20.

Figure 3:
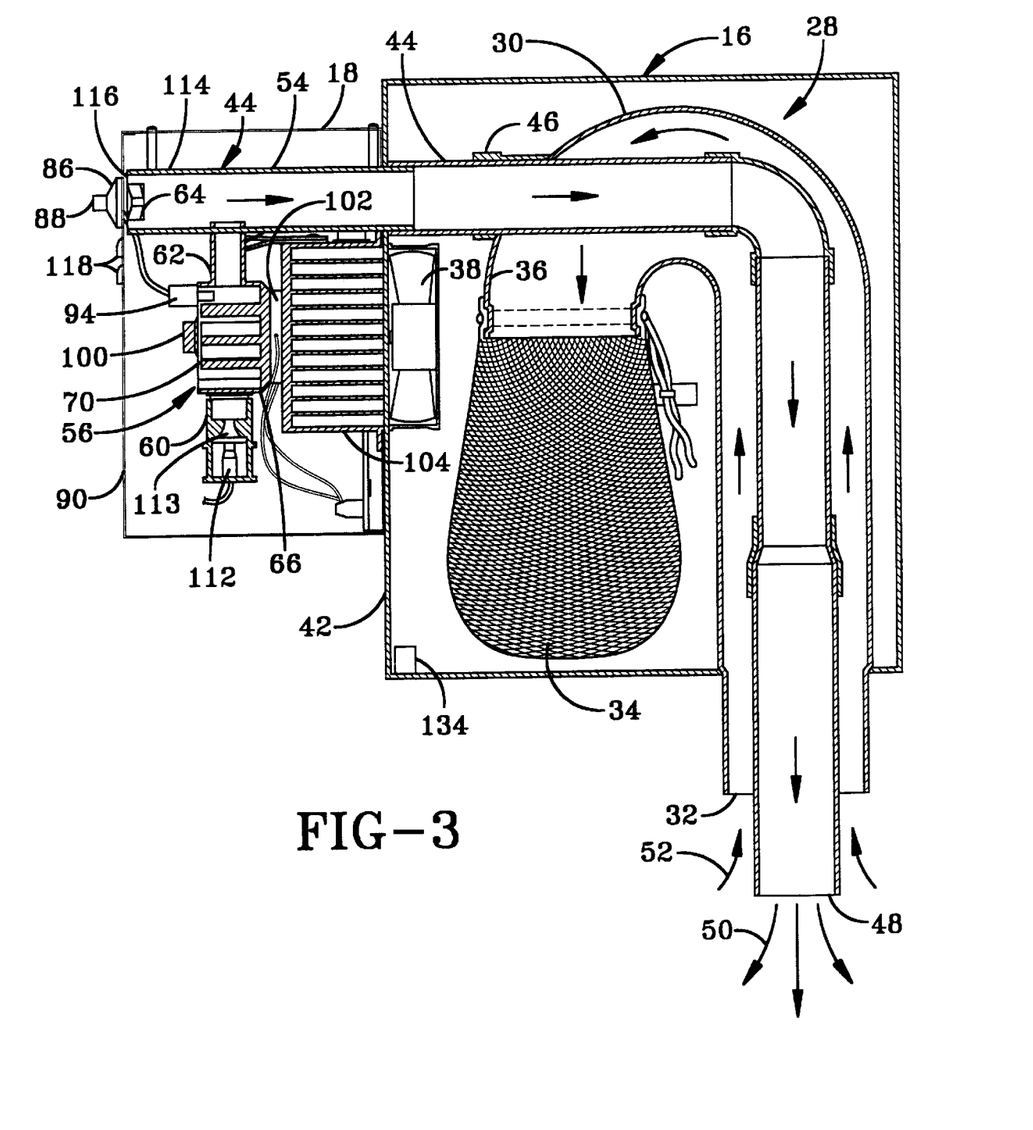
FIG. 3 is a section view through line 3—3 of FIG. 2, illustrating details of a suction trap, an electric power generating system, and a $CO_2$ generating system.
Figure 4:
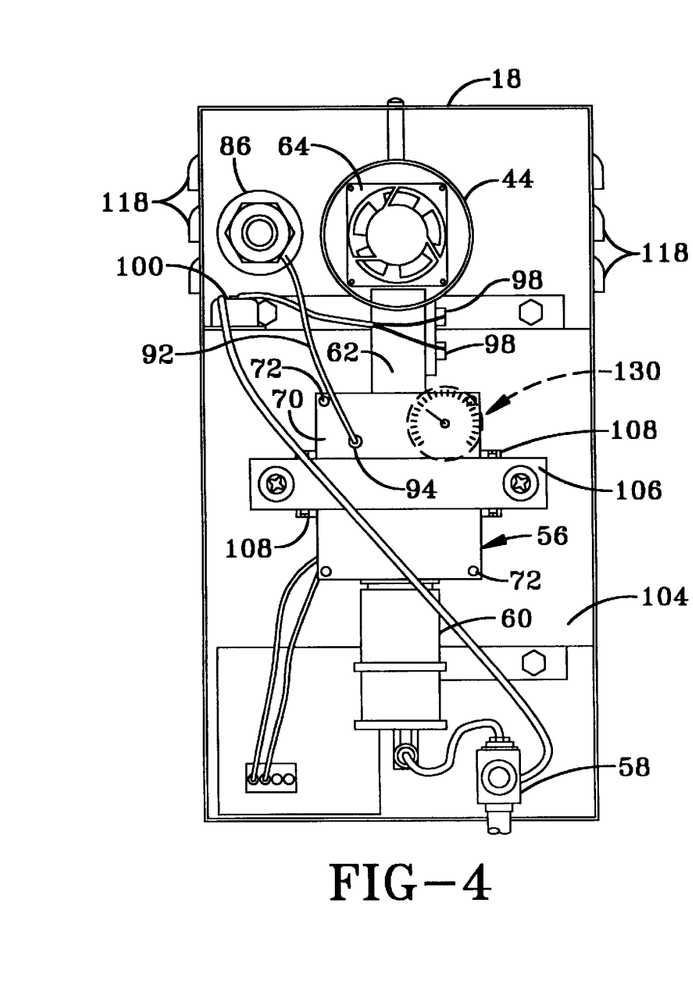
FIG. 4 is a section view through line 4—4 of FIG. 1.
Figure 5:
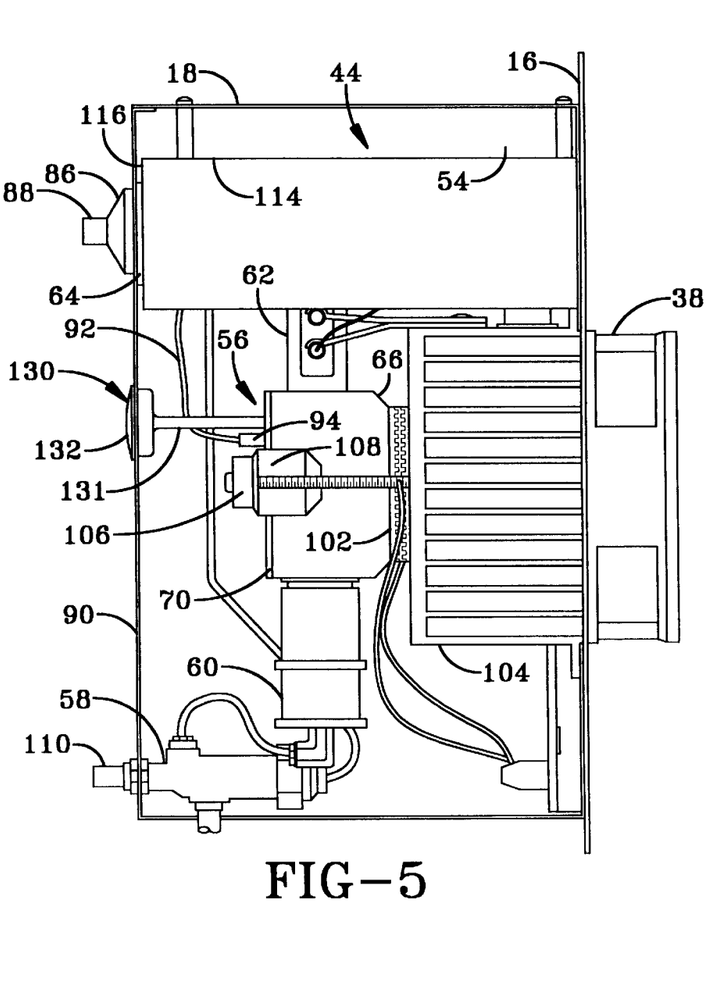
FIG. 5 is a section view through line 5—5 of FIG. 2.

Referring now also to FIG. 3, trapping apparatus 10 includes a counterflow-type insect trap 28 of the type generally described in co-owned patent application Ser. No. 08/718,643. Trap 28 includes a suction tube 30 having an open end 32 extending out from trap enclosure 16. A disposable net bag 34 for trapping insects is tied to the other, outlet end 36 of suction tube 30 inside of trap enclosure 16, with a drawstring 35. A 4.5 inch suction fan 38 is positioned at an opening 40 of an interior wall 42 of trap enclosure 28 to draw air and insects in through suction tube 30, through net bag 34, and exhaust air from trap enclosure 16 into generator enclosure 18.

There is a clear, plastic, hinged door 39 on a side of trap enclosure 16 over the area of net bag 34 to observe the catch. To change net bag 34, door 39 is opened, drawstring is relaxed sufficiently to remove net bag 35, and then cinched up to close net bag 34 completely. In cases where trapping apparatus 10 is used for research, net bags 34 can be reusable.

An exhaust tube 44 provides a flow of an insect attractant, such as $CO_2$ gas, in a direction counter to the direction of flow of air being drawn in through suction tube 30. The exhaust flow is directed downward to the ground, while the air being drawn into trap 28 through suction tube 30 is directed upwards. Exhaust tube 44 enters enclosure 16 through wall 42, then enters suction tube 30 through a side opening 46. Exhaust tube 44 then extends about concentrically within and through suction tube 30. An open end 48 of exhaust tube 44 extends down past open end 32 of suction tube 30 by about three inches. Thus, an exhaust flow is surrounded by an inflow, as indicated by arrows 50, 52, respectively.

Most of exhaust tube 44 is made of sections of interfitting PVC pipe. An exhaust tube extension 54 that extends within generator enclosure 18 is made of a metal. In the described embodiment, extension is made of 2.375 inch id steel tube. Suction tube 30 is primarily a vacuum form with a PVC section at open end 32. Suction tube 30 has an inner diameter of about 4 inches. Exhaust tube, at its open end 48, has an inner diameter of about 2 inches.

An insect attractant that includes $CO_2$ gas and water vapor is generated by burning propane, or any other suitable hydrocarbon fuel, in a catalytic burner 56 located in generator enclosure 18. As described above, the propane source is propane tank 14, which is the same type of tank as is used with gas outdoor grills. An outlet of regulator 24 (see FIGS. 1 and 2) is coupled to an inlet of a propane safety valve 58. An outlet of safety valve 58 is coupled to a fuel inlet of a carburetor 60. Carburetor 60, which can be an inspirated design Venturi, mixes the propane with air and delivers the mixture to the interior of burner 56. Combustion gases, including heated $CO_2$ gas and water vapor, are brought to exhaust tube 44 through a chimney 62 portion of burner 56. A two inch exhaust fan 64 is positioned at an open inlet end of exhaust tube 44 to mix air with the combustion gases and urge the mixture to pass through exhaust tube 44.

Referring now also to FIGS. 6–9, burner 56 is manufactured from an aluminum casting 66 that includes chimney 62 and a combustion chamber 68. A cover plate 70 seals the front opening of combustion chamber 68 with a gasket (not shown), and is held in place with four screws 72. Several fingers 74 extend horizontally through combustion chamber to conduct heat to a backside 76 thereof. A wavy screen 78 or the like is placed over a bottom row of fingers 74. A flat screen 80 and a baffle plate 82 having a pair of slots 83 are positioned immediately below a row of fingers 74. A catalytic bead bed 84 filled with platinum costed alumina beads is retained in combustion chamber 68 between screens 78 and 80.

Screens 78, 80 are made of 20 mesh, square weave, stainless steel screening, with 0.015 inch wire. Baffle plate is made of 0.010 inch thick stainless steel. The interior of combustion chamber is about 2.25 inches wide, about 1.65 inches deep and about 1.6 inches high. The platinum coated alumina beads have a diameter that is no larger than about 0.125 inches.

A high voltage piezo-electric spark igniter 86, of a type often included with gas grills and gas fireplaces, has a manual push-button 88 mounted through a front panel 90 of burner enclosure 18. A high voltage insulated conductor 92 connects the piezo generator to a ceramic-insulated electrode 94 mounted through the combustion chamber cover plate 70. Pressing push-button 88 provides a single spark intended to ignite the propane-air fuel mixture within combustion chamber 68.

Figure 6:
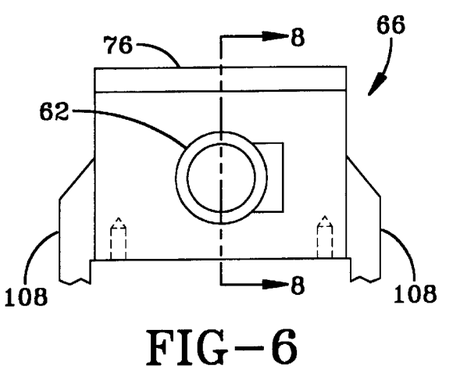
FIG. 6 is a top plan view of a casting for a catalytic burner.
Figure 7:
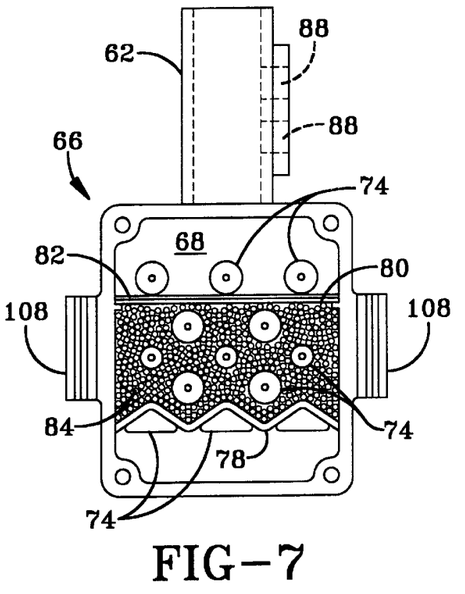
FIG. 7 is a front elevation view of the casting illustrated in FIG. 6

A thermoelectric generator includes an array of four bismuth-telluride thermoelectric modules 102 that are connected in series parallel. Module array 102 is mounted between back side 76 of burner 66 and an extruded aluminum heat sink 104. The output voltage of thermoelectric module array 102 is used to operate suction fan 38 and exhaust fan 64, as will be described in greater detail below. Thermoelectric devices produce power by virtue of the Seebeck effect. The voltage and current generated are a direct function of the number of junctions, the difference in temperature from a hot side of modules 102 adjacent to burner 56 to a cold side adjacent to heat sink 104, and the heat flux through modules 102. To increase the temperature gradient between the hot side and the cold side of modules 102, burner 56 is surrounded by insulating material (not shown), and suction fan 38 blows a flow of air onto heat sink 104 to cool it. Fingers 74 conduct heat from the interior of combustion chamber 66 to back side 76 of burner 66, which is pressed against the hot side of modules 102. Thermoelectric module array 102 is clamped between burner 56 and heat sink 104 to maintain good thermal contact to burner 56 and heat sink 104. A tight clamp is obtained by placing a metal bar 106 over a pair of ears 108 that project from the sides of casting 66 and above cover plate 70, and by securely bolting bar 106 to heat sink 104, employing belleville spring washers to maintain a tight clamp during thermal cycling of the system.

Chimney 62 includes two apertures 96 in which a pair of copper-constantan thermocouples 98 are positioned. A cold side of thermocouples 98 is thermally coupled to heat sink 104. Thermocouples 98 are wired in series to a temperature sensitive, bi-metal switch 100 and to safety valve 58. Switch 100 closes safety valve 58 if the temperature of heat sink 104 exceeds about 180° F.

In operation, gas flows from tank 14 through the tank's shut-off valve and flexible line 22 to regulator 24, which drops the gas pressure to 15 psi. The gas continues at 15 psi to the input side of safety valve 58, which is a flame sensing type of valve. An operator manually energizes valve 58 by pressing a button 110 at the front panel 90 of burner enclosure 18. Gas flows from the output side of valve 58 to a sintered metal disc filter 112 located at an entrance to carburetor 60. Filter 112 is designed to prevent gas contaminants from clogging an orifice restrictor in carburetor 60. Immediately after passing through filter 112, the gas escapes to atmospheric pressure through restrictor 113, which has a 0.004 inch diameter orifice. The gas flows through restrictor 113 as a rate of about one pound of propane in 36 hours. Atmospheric air is inspirated into carburetor 60 by a pressure difference created with two diameters of flow (Venturi principle). An adjustment screw (not shown) is employed to adjust airflow in carburetor 60 by restricting the area of the air entrance.

Figure 8:
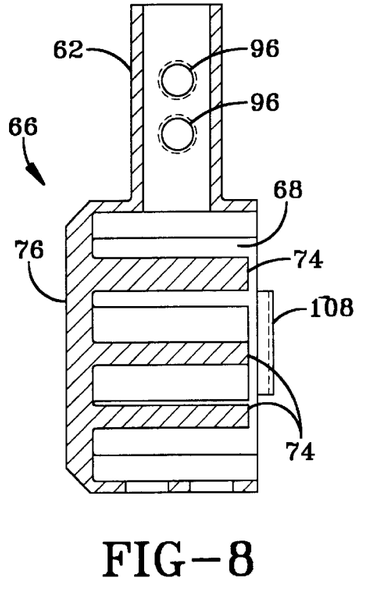
FIG. 8 is a section view through line 8—8 in FIG. 6.
Figure 9:
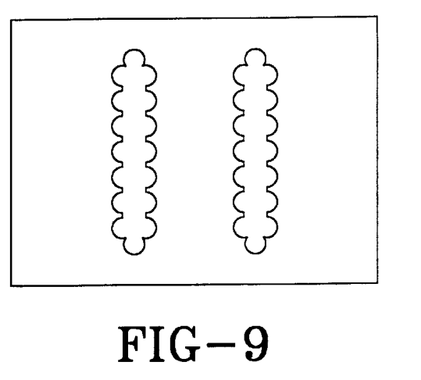
FIG. 9 is a plan view of a baffle plate located in the combustion chamber of the catalytic burner.

The air-fuel mixture enters combustion chamber 68 and flows through screen 78 into catalytic bead bed 84. Screen 78 acts to inhibit reverse propagation of a flame into carburetor 60. At the top of bead bed 84, the mixture passes through the second screen 80 and then through slots 83 in baffle plate 82. The areas and shapes of slots 83 are designed to inhibit a flame developed above baffle plate 82 from traversing back through slots 83 into bead bed 84. The slot areas are determined by the mixture flow velocity and the flame spreading velocity of the propane-air mixture. By keeping the flow through slots 83 at a higher velocity than the reverse flame propagation velocity, the flame will not spread back into bead bed 84 and blow out.

A flame is initiated above bead bed 84 with spark igniter 86. As the flame burns, heat generated from the combustion warms combustion chamber 68 and bead bed 84. After the flame has been going for some 30 seconds to 45 seconds, the heat is reflected down into catalyst bead bed 84. The catalyst is warmed up and as the catalyst is warmed up it achieves a surface combustion temperature and the flame converts to a catalytic surface combustion in bead bed 84. As a greater amount of the fuel-air mixture oxidizes in bead bed 84, the flame becomes starved of fuel and is extinguished. The combustion continues entirely on a catalytic basis.

Exhaust from the combustion exits vertically through chimney 62 and into extension 54 of exhaust tube 44. Once combustion is achieved, thermocouples 98 generate a current corresponding to the temperature in chimney 62. After about ten second of combustion, thermocouples 98 are warmed enough to provide a current sufficient to energize a coil that holds safety valve 58 in an open position, and push button 110 can be released. Two thermocouples are used in the described embodiment because the temperature of the exhaust gases is far lower than the temperature of a flame sensing application where these valves are generally used. If combustion ceases for any reason, thermocouples 98 cool and allow safely valve 58 to close. Safety valve 58 can only be reopened manually. In the same circuit, temperature sensitive bi-metal switch 100 is installed on heat exchanger 104. If, for any reason, suction fan 38 were not to start and the temperature of heat sink 104 rose above about 180° F., switch 100 would open, shutting off current flow from thermocouples 98 to safety valve 58, and valve 58 would close.

Initially, combustion gases escape into burner enclosure 18 through an opening 114 in extension 54 located directly above chimney 62 or through an open end 116 of extension 54. The combustion gases then pass outside through formed louvers 118. When the thermoelectric generator has developed enough power to operate the small exhaust fan 64, fan 64 mixes the warm exhaust gases with atmospheric air and blows the mixture out through opening 48 of exhaust tube 44. Louvers thus serve two purposes—they allow exhaust gases to flow out before exhaust fan 64 begins operation, and they allow atmospheric air to flow into enclosure 18, mixing with exhaust gases for cooling and reducing $CO_2$ gas concentration when fan 64 operates.

Figure 10:
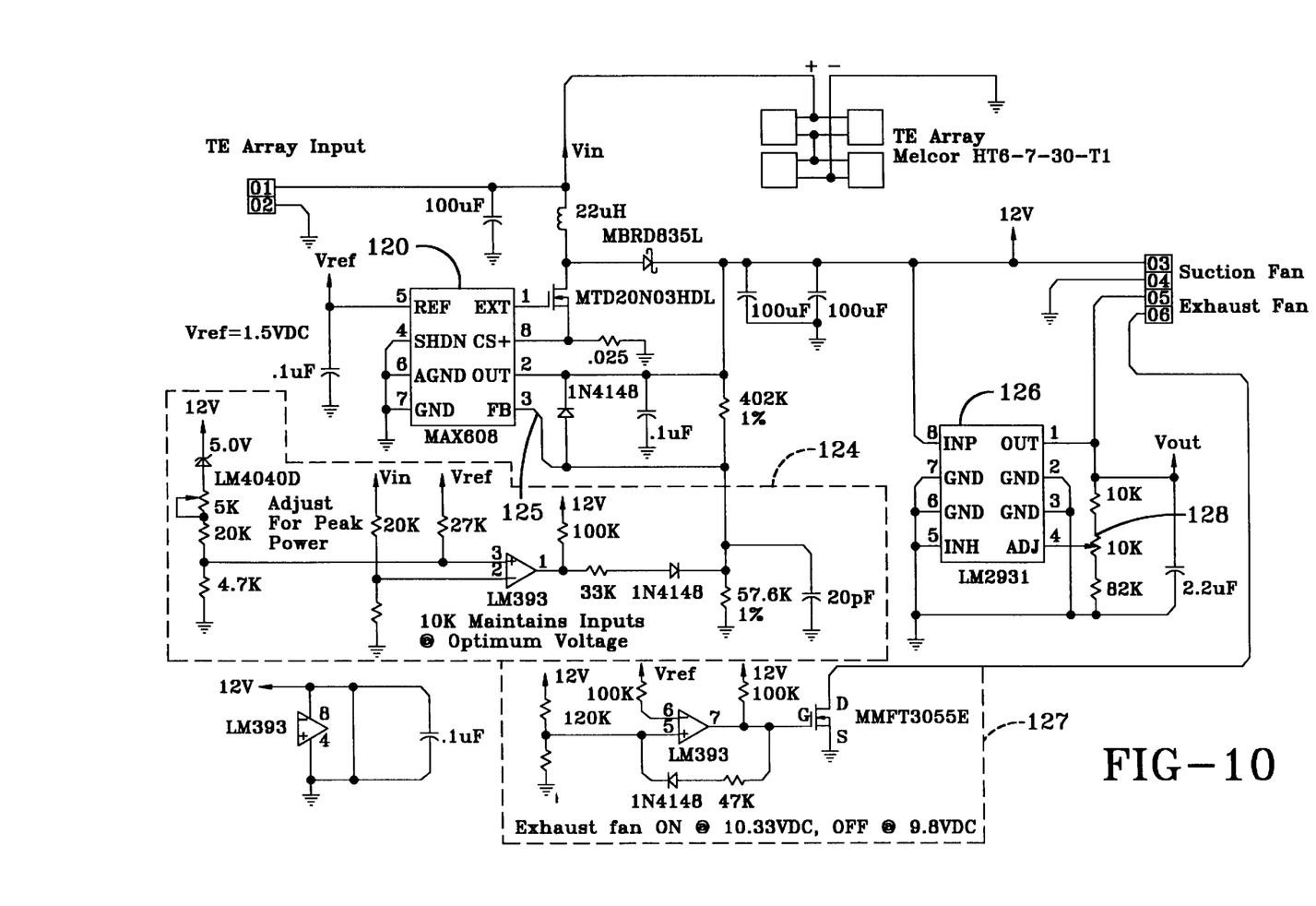
FIG. 10 is a circuit diagram of the electrical system for powering fans in the apparatus illustrated in FIG. 1.

The output voltage of thermoelectric module array 102 is not sufficient to operate suction fan 38 and exhaust fan 64 directly. Referring now also to FIG. 10, the output of thermoelectric module array 102 is fed to the input of a step-up controller 120 located on a circuit board 122. When the voltage reaches about 2 Vdc, controller 120 turns on and provides an output of about 4 Vdc. This voltage is insufficient to start the fans but provides power to a comparator circuit 124. Comparator circuit 124 measures the power capability of thermoelectric module array 102, and, through a feedback path 125 to controller 120, modulates the output voltage of thermoelectric module array 102 to maintain peak power. Without feedback, module array 102 would be allowed to produce current until internal impedance regulated the output voltage. In this mode, the performance point would always settle on the wrong side of the inverse parabolic operating curve. The described circuit allows thermoelectric module array 102 to track and maintain peak power from shortly after start-up to operating temperature.

Suction fan 38 begins to operate when the output voltage reaches 7 Vdc. This is achieved when the temperature of catalyst bead bed 84 reaches about 150° F. The temperature of bead bed will continue to rise up to a running temperature of about 320° F. Suction fan 38 generates an inflow of air into trap 28 through suction tube 30, while at the same time cooling the cold side heat exchanger 104 to increase the temperature difference across thermoelectric module array 102 to produce more power. The output voltage continues to increase with greater temperature differences across thermoelectric module array 102 until reaching the set output of controller 120 at 11 Vdc, and the temperatures are stabilized at their maxima. As the voltage passes about 10 Vdc, a second comparator circuit 127 with fixed hysteresis allows exhaust fan 64 to switch on. The voltage to exhaust fan 64, and thus the exhaust flow velocity and the $CO_2$ concentration in the exhaust flow, is set by a regulator 126. In the described embodiment, step-up controller 120 is a Maxim 608 controller, and voltage regulator 126 is an LM2931 regulator. A level of about 8.4 Vdc provides an exhaust flow with a $CO_2$ concentration of about 1500 ppm in exhaust tube 44, which is particularly useful in attracting mosquitos that prey on humans.

A potentiometer 128 is provided to adjust the speed of exhaust fan 64 while measuring the $CO_2$ concentration in exhaust tube 44. Thus, the speed of exhaust fan 64 can be adjusted up or down to provide a $CO_2$ concentration in exhaust tube 44 of between about 500 ppm and about 2500 ppm, to attract mosquitos that prey on smaller and larger animals, respectively. At concentrations that are outside this range, mosquitos are not attracted in significant numbers.

By mixing ambient air with the hot combustion gases from burner 56, exhaust fan 64 not only reduces the $CO_2$ concentration, but also reduces the temperature of the exhaust flow to less than about 30–45° F. above ambient temperature. It is important that the temperature of the exhaust flow exceed ambient temperature because mosquitos are attracted to heat, but it is equally important that the exhaust temperature not exceed about 115° F. when flowing out from exhaust tube 44. Mosquitos do not home in on a source that exceeds that temperature.

Trap 28 is configured to provide an inflow of air into suction tube 30 with an air speed of about 550 ft/min. This speed inhibits most mosquitos from being able to fly against the inflow and out of trap 28.

Generator circuit uses efficient components to realize maximum power from the minimum amount of combusted fuel. The fuel consumption rate is set to release about 300 to about 500 ml of $CO_2$ per minute. This range is about what an adult human produces with normal respiration. In the described embodiment, the fuel consumption rate is adjusted to release about 350 ml $CO_2$ per minute while allowing a twenty pound fuel source to last about an entire month.

Trapping apparatus 10 also includes a bi-metal temperature sensor 130 with its stem 131 inserted through cover plate 70 of burner 56 and with its indicator face 132 being exposed through front panel 90 of burner enclosure 18. Sensor 130 immediately begins showing a temperature rise after burner 56 is ignited. A point on indicator face 132 is marked to prompt the operator to release gas valve button 110 when the temperature rises above that point. Indicator face 132 has operating ranges (ready; ignition achieved; start-up; and normal) rather than degrees temperatures marked to reduce operator confusion.

The elevation of inlet opening 32 of suction tube 30 can be adjusted to optimize the device's effectiveness in capturing different types of insects. For example, for capturing common North American mosquitos and sand flies, the elevation of inlet opening 32 is optimized at about 18 inches from the ground. For malarial anopheles mosquitos in Africa inlet opening 32 port can be optimized at only about 6 inches above the ground. Extension tubes can be used to adjust the elevation of inlet opening 32.

Insect disabling devices other than net bag 34 can be employed with trap 28. For example, poison can be placed within enclosure 16, or an electronic "bug zapper" can be positioned to receive insects drawn in through suction tube 30.

Volatile insect attractant compounds, such as, for example, octenol, can be used with trap 28. A small open vial 134 (FIG. 3) containing a volatile insect attractant compound can be placed in either of enclosures 16 or 18. The evaporating compound will be drawn into the exhaust flow by exhaust fan 64.

$CO_2$ gas can be provided by a source other than burner 56, and heated and/or diluted by other means than those disclosed in the specific embodiment described above. Any insect trap that releases a mixture of $CO_2$ gas and air with a $CO_2$ concentration in a range between about 500 ppm and about 2500 ppm and/or at a temperature above ambient temperature and below about 115° F. is contemplated to be within the scope of the invention.

Other embodiments are within the scope of the following claims.

What is claimed is:

1. An insect trapping apparatus, comprising:
    an insect trap, including a trap inlet for the entry of insects;
    a $CO_2$ gas source capable of providing $CO_2$ gas having a temperature above ambient temperature wherein the $CO_2$ gas source includes a combustion chamber having an outlet; and
    an attractant exhaust system coupled to the $CO_2$ gas source, the attractant exhaust system being structured and arranged to cool heated $CO_2$ gas and to release an insect attractant comprised of the cooled $CO_2$ gas near the trap inlet at a temperature above ambient temperature and below approximately 115° F.

2. The insect trapping apparatus of claim 1, wherein the attractant exhaust system includes an exhaust pipe communicating with the combustion chamber outlet, the exhaust pipe including an exhaust pipe outlet near the trap inlet.

3. The insect trapping apparatus of claim 2, wherein the exhaust pipe further comprises an exhaust pipe inlet, the insect attractant being further comprised of air entering the exhaust pipe inlet.

4. The insect trapping apparatus of claim 3, wherein the attractant exhaust system is structured and arranged to release the insect attractant with a $CO_2$ concentration in a range between about 500 ppm and about 2500 ppm.

5. The insect trapping apparatus of claim 4, wherein the attractant exhaust system is structured and arranged to release the insect attractant with a $CO_2$ concentration in a range between about 1200 ppm and about 1800 ppm.

6. The insect trapping apparatus of claim 4, wherein the combustor is structured and arranged to provide $CO_2$ gas at a rate of about 300 ml/min to about 500 ml/min.

7. The insect trapping apparatus of claim 4, wherein the attractant exhaust system further includes an exhaust fan positioned to cause air to enter the exhaust pipe inlet and to encourage the insect attractant to flow out from the exhaust pipe outlet.

8. The insect trapping apparatus of claim 3, wherein the exhaust fan is powered by a thermoelectric module that is thermally coupled on a hot side to the combustion chamber and thermally coupled on a cold side to a heat exchanger.

9. The insect trapping apparatus of claim 8, wherein a second fan is arranged to blow air on the heat exchanger, the second fan also being powered by the thermoelectric module.

10. The insect trapping apparatus of claim 9, wherein the second fan is a suction fan arranged to draw air in through the trap inlet.

11. The insect trapping apparatus of claim 1, wherein the trap further includes a mesh bag coupled to the trap inlet via a suction pipe, and wherein a portion of an exhaust pipe extends within and through the suction pipe and extends out from the trap inlet.

12. The insect trapping apparatus of claim 11, wherein the trap further includes a suction fan arranged to draw an airflow in through the trap inlet and out through the mesh bag, the airflow being drawn into the trap inlet being directed counter to and substantially surrounding the exhaust flow of the cooled $CO_2$ gas being released through the exhaust pipe outlet.

13. The insect trapping apparatus of claim 12, wherein the suction fan is powered by a thermoelectric module that is thermally coupled on a hot side to the combustion chamber and that is thermally coupled on a cold side to a heat exchanger, and wherein the suction fan is arranged to direct the airflow from the mesh bag towards the heat exchanger.

14. The insect trapping apparatus of claim 13, wherein the suction fan is arranged to draw the airflow through the trap inlet with a flow velocity of at least approximately 250 cm/sec.

15. The insect trapping apparatus of claim 1, wherein the cooling apparatus is structured and arranged to cool the $CO_2$ gas to a temperature of no more than about 30° F. above ambient temperature.

16. The insect trapping apparatus of claim 1, further comprising a reservoir coupled to the attractant exhaust system for adding an aromatic composition to the insect attractant.

17. A method of trapping insects, comprising:
    providing a trap having a trap inlet through which insects can enter into the trap;
    providing a mixture that includes $CO_2$ gas produced by a combustion chamber and air; and
    releasing the mixture near the trap inlet at a temperature above ambient temperature and below about 115° F.

18. The method of claim 17, wherein the mixture comprises a $CO_2$ gas concentration of between about 500 ppm and about 2500 ppm.

19. The method of claim 17, wherein providing the mixture includes:
    producing heated $CO_2$ gas in the combustion chamber;
    directing the heated $CO_2$ gas from the combustion chamber into an exhaust pipe, the exhaust pipe comprising an exhaust pipe inlet open to air and an outlet near the trap inlet; and
    employing an exhaust fan to mix air from the exhaust pipe inlet with the heated $CO_2$ gas in the exhaust pipe.

20. The method of claim 19, wherein producing heated $CO_2$ gas includes producing about 400 ml of $CO_2$ gas per minute.

21. The method of claim 19, further comprising employing a suction fan to draw an inflow of air in an upward direction into the trap inlet, and wherein releasing the mixture includes directing an exhaust flow of the mixture in a direction downward and counter to the inflow from an exhaust pipe outlet positioned directly below the trap inlet.

22. The method of claim 21, further comprising employing a thermoelectric module to provide electric power to operate the exhaust fan and the suction fan, the thermoelectric module being thermally coupled on a hot side to the combustion chamber and being thermally coupled on a cold side to a heat exchanger.

23. The method of claim 21, wherein the suction fan is arranged to draw the inflow through the trap inlet with a flow velocity of at least approximately 250 cm/sec.

24. The method of claim 19, wherein producing heated $CO_2$ gas in a combustion chamber includes catalytically combusting a hydrocarbon fuel.

25. The method of claim 17, wherein releasing the mixture includes releasing the mixture at a temperature of no more than about 30° F. above ambient temperature.

26. The method of claim 17, wherein the mixture further includes water vapor.

27. An insect trapping apparatus, comprising:
a trap enclosure;
a suction line having a section including a suction line outlet being positioned inside the trap enclosure, and a downward-facing suction line inlet communicating with air outside the trap enclosure;
a mesh bag covering the suction tube outlet;
a suction fan structured and arranged to draw an inflow of air from outside the trap enclosure through the suction line inlet and then through the mesh bag into the trap enclosure, and blow said inflow out from the trap enclosure;
a combustor including a combustor outlet, the combustor being capable of producing $CO_2$ gas having a temperature above ambient temperature;
an exhaust line being coupled to the combustor outlet, one end of the exhaust line having an exhaust line inlet being open to air, another end of the exhaust line having a downward-facing exhaust line outlet positioned directly below the suction line inlet outside the trap enclosure;
an exhaust fan structured and arranged to cause air to enter the exhaust line inlet and mix with heated $CO_2$ gas entering the exhaust line from the combustor outlet to create an insect attractant mixture, and to blow the mixture out from the exhaust line at a temperature above ambient temperature and below approximately 115° F.

28. The insect trapping apparatus of claim 27, further comprising a thermoelectric system providing electric power to the suction fan and to the exhaust fan, the thermoelectric system including a heat exchanger and a thermoelectric module, wherein the thermoelectric module is thermally coupled on a cold side to the heat exchanger and is thermally coupled on a hot side to the combustion chamber, and wherein the suction fan blows the inflow of air on the heat exchanger to cool the heat exchanger.

29. The insect trapping apparatus of claim 28, further comprising a combustor enclosure surrounding the combustor, the thermoelectric system and a portion of the exhaust line that is coupled to the combustor outlet.

30. The insect trapping apparatus of claim 29, further comprising a wheeled cart supporting the combustor enclosure and the trap enclosure.

31. The insect trapping apparatus of claim 27, wherein the combustor is also capable of producing water vapor.

32. The insect trapping apparatus of claim 1, further comprising the trapping apparatus requires electric power to operate, wherein the combustion chamber is part of a hydrocarbon fueled generating system providing all the electric power requirements of the trapping apparatus.

33. An insect trapping apparatus, comprising:
an insect trap, including a trap inlet for the entry of insects;
a $CO_2$ gas source capable of providing $CO_2$ gas having a temperature above ambient temperature, wherein the $CO_2$ gas source includes a combustion chamber having an outlet;
an attractant exhaust system coupled to the $CO_2$ gas source, the attractant exhaust system being structured and arranged to cool heated $CO_2$ gas and to release an insect attractant comprised of the cooled $CO_2$ gas near the trap inlet at a temperature above ambient temperature and below approximately 115° F., and wherein the attractant exhaust system includes an exhaust pipe communicating with the combustion chamber outlet, the exhaust pipe including an exhaust pipe outlet near the trap inlet and the attractant exhaust system further includes an exhaust fan positioned to cause air to enter the exhaust pipe inlet and to encourage the insect attractant to flow out from the exhaust pipe outlet;
the exhaust pipe further comprises an exhaust pipe inlet, the insect attractant being further comprises of air entering the exhaust pipe inlet; and
a second fan arranged to draw air in through the trap inlet.

34. The insect trapping apparatus of claim 33, wherein the exhaust fan and the second fan is powered by a thermoelectric module that is thermally coupled on a hot side to the combustion chamber and thermally coupled on a cold side to a heat exchanger.

35. The insect trapping apparatus of claim 34, wherein the second fan is arrange to blow air on the heat exchanger.

36. A method of trapping insects, comprising:
providing a trap having a trap inlet through which insects can enter into the trap;
providing a mixture that includes $CO_2$ gas produced by a combustion chamber and air; and
releasing the mixture near the trap inlet at a temperature above ambient temperature;
directing the heated $CO_2$ gas from the combustion chamber into an exhaust pipe, the exhaust pipe comprising an exhaust pipe inlet open to air and an outlet near the trap inlet;
employing an exhaust fan to mix air from the exhaust pipe inlet with the heated $CO_2$ gas in the exhaust pipe; and
employing a suction fan to draw an inflow of air in an upward direction into the trap inlet, and wherein releasing the mixture includes directing an exhaust flow of the mixture in a direction downward and counter to the inflow from an exhaust pipe outlet positioned directly below the trap inlet.

37. The method of claim 36, further comprising employing a thermoelectric module to provide electric power to operate the exhaust fan and the suction fan, the thermoelectric module being thermally coupled on a hot side to the combustion chamber and being thermally coupled on a cold side to a heat exchanger.

38. The method of claim 36, wherein the suction fan is arranged to draw the inflow through the trap inlet with a flow velocity of at least approximately 250 cm/sec.

39. An insect trapping apparatus, comprising:

an insect trap, including a trap inlet;

a $CO_2$ gas source;

an attractant exhaust system coupled to the $CO_2$ gas source, being structured and arranged to produce a mixture of $CO_2$ gas and air with a $CO_2$ concentration within a range of about 500 parts per million (ppm) to about 2500 ppm and to release the mixture near the trap inlet, wherein the exhaust system is further structured and arranged to release the mixture near the trap inlet at a temperature above ambient temperature and below about 115° F.

* * * * *

(12) REEXAMINATION CERTIFICATE (4809th)
United States Patent
Wigton et al.

(10) Number: US 6,145,243 C1
(45) Certificate Issued: Jul. 8, 2003

(54) METHOD AND DEVICE PRODUCING $CO_2$ GAS FOR TRAPPING INSECTS

(75) Inventors: Bruce E. Wigton, Jamestown, RI (US); Mark H. Miller, Hope, RI (US)

(73) Assignee: American Biophysics Corp., East Greenwich, RI (US)

Reexamination Request:
No. 90/006,082, Aug. 13, 2001

Reexamination Certificate for:
| | |
|---|---|
| Patent No.: | 6,145,243 |
| Issued: | Nov. 14, 2000 |
| Appl. No.: | 09/009,950 |
| Filed: | Jan. 21, 1998 |

Related U.S. Application Data (63) Continuation-in-part of application No. 08/718,643, filed on Sep. 17, 1996, now Pat. No. 6,286,249.

(51) Int. Cl.[7] .............................. A01M 1/06; A01M 5/08
(52) U.S. Cl. ............................................ 43/139; 43/107
(58) Field of Search ........................... 43/107, 113, 139, 43/132.1

(56) References Cited

U.S. PATENT DOCUMENTS 4,519,776 A    5/1985   DeYoreo et al. ............. 431/328

OTHER PUBLICATIONS

D.G. Peterson and A. W. A. Brown, *Studies of the Responses of the Female Aedes Mosquito. Part III. The Response of the Aedes Aegypti (L.) to a Warm Body and its Radiation*, Biting Insect Technology 535 (1951).

R. R. Carestia and L. B. Savage, *Effectiveness of Carbon Dioxide as a Mosquito Attractant in the CDC Miniature Light Trap*, J. American Mosquito Control Assn. 27(1): 90–92 (Mar. 1967).

M. W. Service, *Mosquito Ecology Field Sampling Methods* ch. 5, Sampling Adults by Animal Bait Catches and by Animal–Baited Traps, 349 (2nd ed. 1995).

M. W. Service, *Mosquito Ecology Field Sampling Methods* ch. 6, Sampling Adults by Carbon Dioxide Traps, Light Traps, Visual Attraction Traps and Sound Traps, 499 (2nd ed. 1995).

T. G. Floore, A. H. Boike, Jr., C. B. Rathburn, Jr., L. A. Sizemore and K. L. King, *Mosquito Trapping Studies to Determine the Efficacy of Two Models of the Flowtron® Mosquito Luring Device* J. Florida Anti–Mosquito Association 51(1): 13–17 (1985).

Dipteran Collection Equipment Folder, American Biophysics Corporation.

Owner's Manual, BugVac™ Model 1101 Electronic Insect Killer.

Daniel L. Kline, *Comparison of Two American Biophysics Mosquito Traps: The Professional and a New Counterflow Geometry Trap* J. American Mosquito Control Assn. 15(3): 276–282 (1999).

Douglas A. Burkett, Won J. Lee, Kwan W Lee, Heung C. Kim, Hee I. Lee, Jong S. Lee, E. H. Shin, Robert A. Wirtz, Hae W. Cho, David M. Claborn, Russell E. Coleman, and Terry A. Klein, *Light, Carbon Dioxide, and Octenol–Baited Mosquito Trap and Host–Seeking Activity Evaluations for Mosquitoes in a Malarious Area of the Republic of Korea* J American Mosquito Control Assn. 17(3): 196–205 (2001).

*Primary Examiner*—Daren W. Ark (57) ABSTRACT

An insect trapping device generates its own insect attractants of carbon dioxide ($CO_2$), heat and water vapor through catalytic conversion of a hydrocarbon fuel in a combustion chamber. The hot insect attractants generated in the combustion chamber are diluted and cooled to a temperature above ambient temperature and below about 115° F. by mixing with air, and then the mixture is exhausted downward through the exhaust tube. A counterflow of outside air is drawn into the trap though the suction tube that concentrically surrounds the exhaust tube. Biting insects are captured in a porous, disposable bag connected to the other end of the suction tube. A thermoelectric generator, including thermoelectric modules coupled to the combustion chamber generate power for fans that provide the exhaust flow and the suction flow. Additional chemical attractants may be used with the device to make the trap even more effective. The trap may be adapted for trapping different types of insects by adjusting airflow velocities and attractants.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–7, 11–39 is confirmed.

Claim 8 is determined to be patentable as amended.

Claims 9 and 10, dependent on an amended claim, are determined to be patentable.

New claims 40–48 are added and determined to be patentable.

8. The insect trapping apparatus of claim [3] *7*, wherein the exhaust fan is powered by a thermoelectric module that is thermally coupled on a hot side to the combustion chamber and thermally coupled on a cold side to a heat exchanger.

*40. The insect trapping apparatus of claim 1, further comprising a fan system coupled to said trap inlet and said attractant exhaust system, said fan system being operable to (a) draw air into the trap inlet and thus encourage insects to be drawn into the trap inlet and (b) encourage the insect attractant to flow out from said attractant exhaust system.*

*41. The insect trapping apparatus of claim 40, wherein the fan is operable to draw the air into said inlet such that the air being drawn into said inlet flows counter to the insect attractant flowing out from said attractant exhaust system while outside said apparatus.*

*42. The insect trapping apparatus of claim 41, wherein the air being drawn into said inlet substantially surrounds the insect attractant flowing out from said attractant exhaust system while outside said apparatus.*

*43. The method of claim 17, further comprising operating a fan system coupled to said trap inlet to (a) draw air into the trap inlet and thus encourage insects to be drawn into the trap inlet and (b) encourage the mixture to flow outwardly from said trap.*

*44. The method of claim 43, wherein the fan draws the air into said inlet such that the air being drawn into said inlet flows counter to the mixture flowing out from said trap while outside the trap.*

*45. The method of claim 44, wherein the fan draws the air into said inlet with the air being drawn into said inlet substantially surrounding the mixture flowing out from said trap while outside the trap.*

*46. The insect trapping apparatus of claim 39, further comprising a fan system coupled to said trap inlet and said attractant exhaust system, said fan system being operable to (a) draw air into the trap inlet and thus encourage insects to be drawn into the trap inlet and (b) encourage the mixture to flow out from said attractant exhaust system.*

*47. The insect trapping apparatus of claim 46, wherein the fan is operable to draw the air into said inlet such that the air being drawn into said inlet flows counter to the mixture flowing out from said attractant exhaust system while outside said apparatus.*

*48. The insect trapping apparatus of claim 47, wherein the air being drawn into said inlet substantially surrounds the mixture flowing out from said attractant exhaust system while outside said apparatus.*

\* \* \* \* \*